United States Patent Office  3,070,591
Patented Dec. 25, 1962

3,070,591
MODIFIED SULFONATED LIGNIN MATERIAL AND PROCESS OF PRODUCING THE SAME
Charles H. Hoyt, Camas, Wash., assignor to Crown Zellerbach Corporation, San Francisco, Calif., a corporation of Nevada
No Drawing. Filed Aug. 24, 1960, Ser. No. 51,544
25 Claims. (Cl. 260—124)

This invention relates to a modified sulfonated lignin material and to a process of producing the same. More particularly, this invention relates to a material comprising oxidized sulfonated lignin and to a process for its preparation.

It is known that sulfonated lignin materials, such as spent sulfite liquor, may be subjected to oxidation with strong oxidizing agents, such as hydrogen peroxide, sodium peroxide, sodium or potassium persulfate, potassium or sodium permanganate, potassium and sodium dichromate, chromic acid, etc. These oxidizing agents are characterized by having an oxidation potential stronger than —1.3 volts as determined in strongly acidic aqueous solutions. There are certain disadvantages, however, in the use of strong oxidizing agents for oxidation of sulfonated lignin materials. For instance, in many cases the reaction proceeds too rapidly and is difficult to control; also, in many instances, a thickening of the reaction mixture may occur causing undesirable gelation of the reaction products.

I have now discovered that improved oxidized sulfonated lignin material may be prepared using a weak oxidizing agent, namely nitric acid. As is known, nitric acid has an oxidation potential of —0.9 volt as determined in strongly acidic aqueous solutions.

The principal object of this invention, therefore, is the provision of a process for the preparation of a modified sulfonated lignin material.

A further object of this invention is the provision of an improved modified sulfonated lignin material having enhanced properties.

Still another object of the present invention is the provision of an improved process of producing an oxidized sulfonated lignin material, which process is easily controlled, does not result in a formation of insoluble reaction products and may be carried out in a simple manner and at a low cost.

The importance of this invention and the advantages afforded thereby will be more fully appreciated from the detailed description and claims which follow.

Briefly, the process of this invention comprises admixing, in aqueous medium, a sulfonated lignin material and a strong acid comprising essentially nitric acid as the oxidizing agent and reacting the mixture for a time sufficient to form an oxidized sulfonated lignin material. The resulting liquid reaction product may be spray-dried, whereby it is converted to a free-flowing, finely divided powder. In another embodiment of this invention the oxidized sulfonated lignin material may be combined with a compound containing an acid-soluble polyvalent metal cation, whereby the resulting salt of oxidized sulfonated lignin material will contain the cation incorporated into the reaction mixture.

The sulfonated lignin materials suitable for using in the preparation of the products of this invention include sulfonated alkali lignins, i.e. sulfonated kraft lignins or soda lignins, as well as calcium, ammonium, magnesium, or sodium ligninsulfonates which are normally obtained in the form of sulfite spent liquor from the pulping of wood or other lignocellulose materials by the conventional sulfite or bisulfite processes. Although the composition of the spent sulfite liquor is somewhat variable, depending upon the cooking conditions and the fibrous material employed, its content of ligninsulfonates ranges generally between about 40% and 70% by weight, dry basis. A product of this type is a sodium-base or ammonium-base sulfite spent liquor manufactured and sold by Crown Zellerbach Corporation, San Francisco, California, under the trademark Orzan. Such products, are available in liquid form in a wide range of concentrations as well as in the form of a dry powder.

Sulfite spent liquor products from which sugars have been partially or completely removed by any of the usual methods, such as fermentation, and thus containing primarily ligninsulfonates, are also suitable for use in this invention.

The sulfonated alkali lignins mentioned hereinabove may be produced by precipitating alkali lignin contained in alkaline spent pulping liquor by means of a mineral acid, isolating the precipitated lignin material and treating it with either sulfurous acid or a water-soluble bisulfite until a water-soluble sulfonated lignin material is formed.

The other essential reactant in the process of the present invention, namely nitric acid, may be employed in any of the commercially available concentrations, such as fuming nitric acid, concentrated nitric acid, or diluted nitric acid.

The acid-soluble polyvalent metal cation which may be employed for preparing polyvalent metal salts of oxidized sulfonated lignin may include various salts of nickel, chromium, iron, copper, aluminum, cobalt, magnesium, zinc, cadmium, titanium, bismuth, etc. It should be noted that when a chromium salt is employed, chromium is present in the form of a cation, as for example in chromium sulfate, nitrate or chloride.

It is also within the scope of this invention to employ oxides or hydroxides of the above-mentioned polyvalent metals, provided that such hydroxides or oxides are capable of forming an acid-soluble salt.

In preparing the products of this invention, a sulfonated lignin material is mixed in aqueous medium preferably water, with nitric acid alone, or a strong acid containing nitric acid, using any conventional mixing equipment. The reaction mixture is allowed to react until an oxidized sulfonated lignin material is formed. When a polyvalent metal cation is employed as one of the reactants, it may be added to the sulfonated lignin material, either before, or during, or after its oxidation with nitric acid. However, it is preferred to first oxidize the sulfonated lignin material and thereafter treat it with a polyvalent metal cation.

The resulting liquid oxidized sulfonated lignin material may be spray-dried in a conventional spray-drying equipment to produce a free-flowing powdered product.

Although the concentration and the relative proportions of the reactants of the present invention may vary within a wide range, the practical applications have indicated that the sulfonated lignin material should be employed in the form of an aqueous solution containing preferably from 30 to 60% solids by weight.

As mentioned hereinabove, the nitric acid may be employed either alone or in admixture with another strong acid. Although nitric acid may be used in its fuming, concentrated (70%), or dilute form, it should not be diluted prior to its addition to the lignin material to a concentration of less than about 20% by weight. The preferred concentration of nitric acid is in the range of between 40% and 70% by weight.

Strong acids which may be employed in combination with nitric acid may include sulfuric acid, hydrochloric acid, phosphoric acid, para-toluene-sulfonic acid, etc. When a mixture of strong acids is used, the amount of nitric acid present therein should be no less than 1% by weight, and preferably between 20% and 80% by weight.

The amount of nitric acid (100% basis) employed for the oxidation of sulfonated lignin may range from 1% to 30% by weight of dry solids of the sulfonated lignin, preferably between 5% and 15% of nitric acid. These amounts may apply regardless whether nitric acid is used alone or in admixture with another strong acid.

When a polyvalent metal cation is employed as one of the reactants in the present invention, the polyvalent metal salt should be incorporated in such an amount as to supply from about 1% to 50% of the metal, by weight, based on the dry sulfonated lignin and preferably from 3% to 25% of the metal by weight.

The temperature of the oxidation reaction may vary, in general, between room temperature, i.e. about 20° C., and the boiling point of the reaction mixture. However, the preferred temperature range is between 70° C. and 95° C.

The time of the reaction may vary depending on the amount of the oxidizing agent employed, its concentration, the reaction temperature and the desired properties of the reaction product. In general, the reaction is allowed to proceed until the sulfonated lignin is oxidized without being degraded to avoid substantially its conversion to nitrolignins, simple organic acids and carbon dioxide. The oxidation period of time may be as low as about 5 minutes and as long as 2 hours or even longer.

The pH of the reaction medium is, of course, very low. In most of the cases, its value will be below 1. If it is desired to raise the pH of the resulting liquid reaction product, a polyvalent metal salt of a weak acid, such as carbonic, boric, silicic, etc., or metal oxides or hydroxides soluble in acidic solutions may be added.

The oxidized sulfonated lignin materials of this invention are particularly useful as additives to well drilling muds, inasmuch as they greatly enhance drilling operations under severe conditions of shale, quartz, siliceous materials, gypsum and salt contamination. While I do not intend to be limited by any theory expressed herein, it appears that the sulfonated lignin materials oxidized with nitric acid, which has an oxidation potential much weaker than that of strong oxidizing agents mentioned hereinabove, are characterized by markedly improved properties when used as additives to drilling muds. For instance, I have observed that products of this invention are superior in viscosity reduction of drilling muds than those which have been oxidized by strong oxidizing agents, such as alkali metal chromates or peroxides.

The sulfonated lignin materials produced in accordance with the present invention may also find use as dispersing agents in various industrial applications.

The following examples illustrate, but in no way limit the products of this invention as well as the methods of their preparation. All the amounts in the examples are expressed in parts by weight.

*Example 1*

To 100 parts of sulfonated lignin material solids in form of a 50% aqueous solution and heated to 90° C. is added slowly 4 parts of nitric acid (100% basis) in form of a 52% solution by weight. The two reactants are mixed for 60 minutes during which time nitric oxide vapors are evolved indicating that oxidation of the lignin material occurs. At the end of this period of time the solution is spray-dried in a conventional spray-drying apparatus, to produce a free-flowing dry powder producut. The oxidized sulfonated lignin material thus produced is water-soluble and may be employed as an additive to drilling muds.

The sulfonated lignin material employed in this example was a sodium-base sulfite spent liquor having a ligninsulfonate content of about 58% (solids basis) and a pH of 7, in form of a concentrated aqueous solution having about 50% solids content, supplied by Crown Zellerbach Corporation, San Francisco, California, under the trademark Orzan SL–50.

*Example 2*

The reactants and the method of preparation of the oxidized sulfonated lignin material of this invention were the same as in Example 1, except that 8 parts of nitric acid (100% basis) was used.

*Example 3*

In this example, strong acid consisting of a mixture of equal parts by weight of 52% nitric acid and 93% sulfuric acid was employed under the same conditions as in Example 1.

*Example 4*

To an oxidized sulfonated lignin material prepared under the conditions of Example 1 is added 50 parts of nickelous nitrate, corresponding to 10 parts of nickel metal. The reactants were mixed for 5 minutes at which time a nickel salt of oxidized sulfonated lignin material was formed.

*Example 5*

The reactants and the method of preparation were the same as in Example 4, except that 18 parts of chromium sulfate, corresponding to 3 parts of chromium metal were employed.

*Example 6*

The reactants and the method of preparation were the same as in Example 4, except that 25 parts of nickelous nitrate corresponding to 5 parts of nickel metal and 16 parts of manganese sulfate, corresponding to 5 parts of manganese metal were employed.

*Example 7*

The reactants and the method of preparation were the same as in Example 4, except that 25 parts of nickelous nitrate corresponding to 5 parts of nickel metal and 25 parts of zinc sulfate corresponding to 6 parts of zinc metal were employed.

*Example 8*

The reactants and the method of preparation were the same as in Example 4, except that 12.5 parts of nickelous nitrate, corresponding to 2.5 parts of nickel metal and 13 parts of zinc oxide, corresponding to 10 parts of zinc metal were employed.

*Example 9*

A strong acid consisting of 60 parts of nitric acid of 52% concentration and 40 parts of sulfuric acid of 93% concentration by weight, was added to 100 parts of calcium-base ligninsulfonate in form of a 50% aqueous solution by weight in an amount sufficient to supply 5 parts of nitric acid (100% basis). The oxidation reaction was allowed to proceed at a temperature of between 90° C. and 100° C. for a period of 45 minutes, after which time an aqueous solution of nickelous nitrate and titanium sulfate was mixed in an amount sufficient to supply 12.5 parts of nickelous nitrate corresponding to 2.5 parts of nickel metal and 22 parts of titanium sulfate, corresponding to 6.5 parts of titanium metal.

*Example 10*

The reactants and the method of preparation were the same as in Example 9, except that 13 parts of magnesium oxide, corresponding to 8 parts of magnesuim metal were employed.

*Example 11*

The reactants and the method of preparation were the same as in Example 9, except that 7 parts of ferrous sulfate, corresponding to 1.5 parts of iron metal and 13% of zinc oxide corresponding to 10 parts of zinc metal were employed.

Example 12

To an aqueous solution of sodium ligninsulfonate containing 50% solids by weight is added an aqueous solution containing 50 parts of 52% nitric acid and 50 parts of 93% sulfuric acid in an amount sufficient to supply 8% of nitric acid (100% basis) on ligninsulfonate solids content. The liquid mixture is allowed to react for 30 minutes at a temperature between 90° C. and 100° C. Thereafter an aqueous solution containing nickel oxide and zinc sulfate is added in an amount sufficient to supply 4 parts of nickel oxide, corresponding to 3 parts of nickel metal and 50 parts of zinc sulfate, corresponding to 12 parts of zinc metal. After 5 minutes of mixing, an oxidized sulfonated lignin material containing zinc and nickel cations is produced.

In order to evaluate the effectiveness of modified sulfonated lignin materials prepared in accordance with this invention as drilling mud additives, 2 pounds per bbl. of the product prepared in accordance with Example 12 was incorporated into a commercial bentonite-based drilling mud together with 8 lbs. per bbl. of gypsum and 5 lbs. per bbl. of sodium chloride. Sufficient sodium hydroxide was also added in order to increase the pH of the mud to 10. The resulting mixture was heated for 30 minutes at 85° C., cooled at 20° C., and tested in accordance with the American Petroleum Institute procedures. The results obtained were very satisfactory, in particular the Fann viscosity at 600 r.p.m. was 9.5, indicating superior qualities of a drilling mud into which a relatively small amount of a modified sulfonated lignin material of this invention was incorporated.

Excellent drilling muds were also prepared including the modified lignin materials of this invention prepared in accordance with other examples. These muds were suitable for use under deep well conditions encountering hydrate and salt contamination and containing soluble calcium to the extent to at least 200 parts per million.

From the foregoing it will be apparent that by the presently described invention I have developed modified sulfonated lignin materials which are characterized by many advantageous properties, particularly when applied as additives to drilling muds. These and other advantages are obtained, furthermore, using a sulfonated lignin product which is readily available in large quantities at a very low cost and which heretofore has been considered as a waste by-product of the pulping industry.

Having described my invention in preferred embodiments, I claim:

1. A process of producing a modified sulfonated lignin material which comprises admixing, in aqueous medium, a sulfonated lignin material and a strong acid comprising essentially nitric acid as the oxidizing agent, the amount of the strong acid being sufficient to provide from 1% to 30% of nitric acid by weight of dry solids of the sulfonated lignin, and reacting for a time sufficient to form a substantially undegraded oxidized sulfonated lignin material.

2. The process of claim 1 wherein said oxidized sulfonated lignin material is spray-dried to a free-flowing powder form.

3. The process of claim 1 wherein the sulfonated lignin material comprises a ligninsulfonate.

4. The process of claim 1 wherein the strong acid is added in a concentration higher than about 20% by weight.

5. The process of claim 1 wherein the strong acid is added in an amount sufficient to provide from 5% to 15% of nitric acid by weight of the sulfonated lignin, dry basis.

6. The process of claim 1 wherein the reaction is effectuated at a temperature between about 20° C. and the boiling point of the reaction mixture.

7. The process of claim 1 wherein the reaction is effectuated at a temperature between about 70° C. and about 95° C.

8. A process of producing a modified sulfonated lignin material which comprises admixing, in aqueous medium at a temperature between 70° C. and 95° C., a ligninsulfonate and a strong acid comprising essentially nitric acid as the oxidizing agent, said strong acid having a concentration between 40% and 70% by weight and being added in an amount sufficient to provide from 5% to 15% of nitric acid by weight of the ligninsulfonate, dry basis, reacting for a time sufficient to form a substantially undegraded oxidized ligninsulfonate, and spray-drying the resulting oxidized ligninsulfonate to produce a free-flowing powdered product.

9. A modified sulfonated lignin material produced by the process of claim 1.

10. A process of producing a modified sulfonated lignin material which comprises reacting in aqueous medium: (a) a sulfonated lignin material, (b) a compound containing an acid-soluble polyvalent metal cation and (c) a strong acid comprising essentially nitric acid as the oxidizing agent, the amount of the strong acid being sufficient to provide from 1% to 30% of nitric acid by weight of dry solids of the sulfonated lignin, for a time sufficient to form a salt of a substantially undegraded oxidized sulfonated lignin material containing said cation.

11. The process of claim 10 wherein said salt of oxidized sulfonated lignin material is spray-dried to a free-flowing powder form.

12. The process of claim 10 wherein the sulfonated lignin material comprises a ligninsulfonate.

13. The process of claim 10 wherein the sulfonated lignin material comprises sodium ligninsulfonate.

14. The process of claim 10 wherein the compound containing an acid-soluble polyvalent metal cation comprises a polyvalent metal salt.

15. The process of claim 10 wherein the compound containing an acid-soluble polyvalent metal cation comprises a nickel salt.

16. The process of claim 10 wherein the compound containing an acid-soluble polyvalent metal cation comprises a chromium salt in which Cr is in the form of a cation.

17. The process of claim 10 wherein the compound containing an acid-soluble polyvalent metal cation is added in an amount from 1% to 50% of the metal by weight of the sulfonated lignin, dry basis.

18. The process of claim 10 wherein the strong acid is added in a concentration higher than about 20% by weight.

19. The process of claim 10 wherein the strong acid is added in an amount sufficient to provide from 5% to 15% of nitric acid by weight of the sulfonated lignin, dry basis.

20. The process of claim 10 wherein the reaction is effectuated at a temperature between about 20° C. and the boiling point of the reaction mixture.

21. The process of claim 10 wherein the reaction is effectuated at a temperature between about 70° C. and about 95° C.

22. A process of producing a modified sulfonated lignin material adapted for use as a drilling mud additive which comrises the following sequence of steps:
   (a) reacting in aqueous medium at a temperature between 70° C. and 95° C. a lignin sulfonate with a strong acid comprising essentially nitric acid as the oxidizing agent, said strong acid having a concentration between 40% and 70% by weight and being added in an amount sufficient to provide from 5% to 15% of nitric acid by weight of the ligninsulfonate, dry basis, for a time sufficient to form a substantially undegraded oxidizing ligninsulfonate;
   (b) adding to the resulting acidic solution of oxidized ligninsulfonate a compound containing an acid-soluble polyvalent metal cation in an amount of from 3% to 25% of the metal by weight of the ligninsulfonate, dry basis;

(c) reacting said oxidized ligninsulfonate with said cation-containing compound for a time sufficient to form a salt of oxidized ligninsulfonate containing said cation; and (d) spray-drying the resulting salt of oxidized ligninsulfonate to produce a free-flowing powdered product.

23. An oxidized modified sulfonated lignin material produced by the process of claim 10.

24. An oxidized modified sulfonated lignin material produced by the process of claim 11.

25. An oxidized modified ligninsulfonate produced by the process of claim 22.

References Cited in the file of this patent

UNITED STATES PATENTS

| 2,935,473 | King et al. | May 3, 1960 |

FOREIGN PATENTS

| 103,651 | Great Britain | Jan. 4, 1918 |
| 640,776 | France | July 21, 1928 |
| 28,935 | Norway | July 15, 1918 |
| 33,642 | Norway | Dec. 5, 1921 |

OTHER REFERENCES

Wise and John: Wood Chemistry, 2nd edition, vol. 1, (1952), pages 474–475. A.C.S. Monograph No. 97, Reinhold Pub. Co., New York, N.Y.